Figure 1:
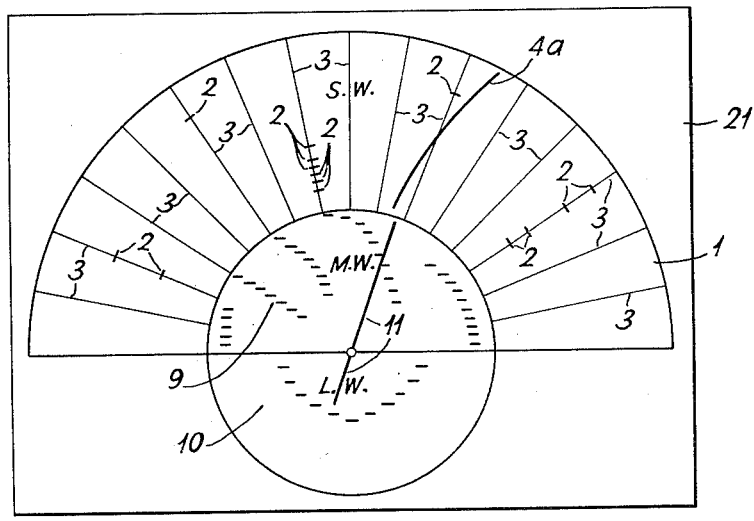

Feb. 28, 1939.   J. D. BRAILSFORD   2,148,976
INDICATOR AND SCALE ARRANGEMENT
Filed Feb. 15, 1938

INVENTOR
JOSEPH D. BRAILFORD
BY
ATTORNEY

Patented Feb. 28, 1939

2,148,976

UNITED STATES PATENT OFFICE 2,148,976

INDICATOR AND SCALE ARRANGEMENT

Joseph Douglas Brailsford, London, England, assignor to Radio Corporation of America, a corporation of Delaware Application February 15, 1938, Serial No. 190,571
In Great Britain February 20, 1937

4 Claims. (Cl. 116—124.1)

This invention relates to tuning and other indicator and scale arrangements suitable for use for radio receivers, wave meters and the like, and, though not limited to its application thereto, is particularly advantageous for use for radio receivers capable of receiving over the short wave broadcast bands—at present, the 19 metre, 25 metre, 31.5 metre and 49 metre bands.

As is well known, owing to the fact that a very small movement of the tuning device of a short wave receiver is sufficient to produce a change of tuning over a range in which there may be several short wave transmitter stations, it is very difficult to produce an indicator and scale arrangement covering all the present short wave broadcast bands and which shall be such as to give sufficient room on the scale for the various short wave stations to be marked by name. In many present day short wave receivers a plurality of scales is used for the short wave bands, necessitating the provision of means for changing over the indicator from one scale to another, and even then the stations are often so crowded together on the individual scales that it is impracticable or inconvenient to mark them by name so that unless the operator is very familiar with the stations available, it is very easy to operate the tuning control to pass right through a station without noticing that it is there. An important object of the invention is to avoid these defects. According to this invention an indicator and scale arrangement suitable for use for a radio receiver, wave meter, or the like, comprises an indicator device providing a cursor line, a scale, and means for moving said cursor line and scale relative to one another, the direction of relative motion making an angle with the direction of length of the cursor line, wave lengths, frequencies, station names or other indicia being marked on said scale along a series of lines each making an angle with the direction of said relative motion and said cursor line being so arranged with respect to the lines of said series of lines, that said cursor line intersects with one or other of said series of lines at a point which travels along said line as said relative motion takes place, said point of intersection (which gives the indication) travelling along the lines of said series of lines in succession as said relative motion continues.

Preferably the scale is an annularly shaped scale and said series of lines are radial lines thereon, the cursor line being a curved line which crosses any radial scale line with which it intersects at an acute angle. Preferably also the curvature is such as to give equal radial movements of the points of intersection for equal angular relative movements between scale and cursor line.

Obviously the lines of the series of lines need not actually be drawn upon the scale but may be imaginary lines joining points representative of different wave lengths, frequencies or station names.

From the point of view of arranging the station names it is preferable that the scale should move and the cursor remain fixed, but from the point of view of mechanical simplicity it is preferable for the cursor to move and the scale to be stationary. Either arrangement may be adopted. The angle of rotation may be substantially 360° but obviously a different angle of rotation may be provided for—e. g. 180°.

Figure 2:
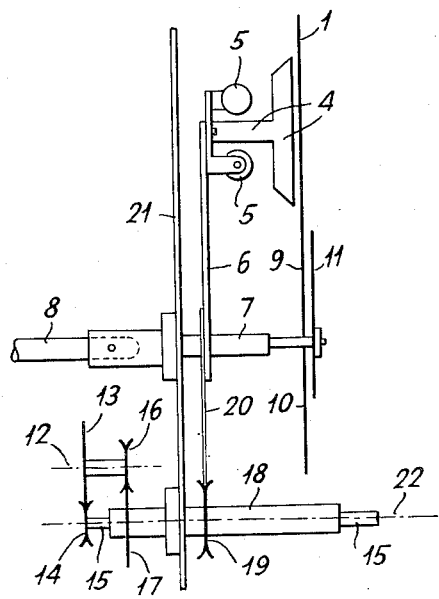
Figure 3:
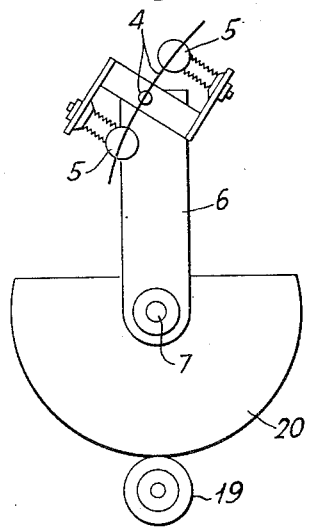

The invention is illustrated in the accompanying drawing in which Figure 1 is a face view showing the scale arrangement, Figure 2 a schematic side view showing the cursor and scale arrangement and Figure 3 a schematic front view of the mechanism of Figure 2, of a preferred embodiment in which the invention is applied to a so-called "all wave" radio receiver having the usual change switch arrangement. In this embodiment there is employed, for the short wave ranges, a fixed annular (actually a semi-annular) scale 1 on which station names, wave lengths, frequencies, or other indicia, are marked (such markings are exemplified by the short lines 2) on a series of radial lines 3 (real or imaginary). The total effective scale length, i. e. the total length of all the lines in the series is equal to the number of lines 3 multiplied by the length per line and may easily be made several feet. These radial lines 3 are equally spaced round the scale 1. Behind the scale 1, which is semi-transparent, is a cursor 4 in the form of a T-shaped piece of metal the cross member of which is curved as shown and which is supported by the other member thereof. Behind the cursor are two small electric lamps 5 and the arrangement is such that the curved cross member of the cursor 4 casts a similarly curved shadow line on the scale 1. This shadow line is represented at 4a in Figure 1 and the curvature and dimensions are such that when one end of the shadow line 4a is just touching the outer end of one of the radial scale lines 3, the other end of the said line 4a is just about to touch the inner end of the next radial scale line 3. Thus if the cursor 4 be rotated past the scale 1 the line 4a will "scan" the radial lines 3 in succession. The curvature of the line 4a is preferably so chosen that, for equal angular movements of the cursor, the point of intersection of the line 4a with a radial line 3 moves equal distances along it.

The cursor 4 and lamps 5 are carried on the outer end of a radial arm 6 whose inner end is fast on a driving extension 7 of the tuning shaft 8 (e. g. the shaft of a condenser gang) of the receiver to which the device is fitted. The range of rotation of shafts 7, 8, is 180° and these shafts are colinear with the point which is the centre about which the scale 1 extends. In addition to the short wave scale 1 there is a medium scale 9 and a long wave scale 10, each semi-circular in shape and the former being concentrically within the scale 1. The end of the shaft 7 is reduced to pass through the centre of the scale unit and carries a double ended pointer 11 which co-operates with the scales 9 and 10. The shaft 7 can be driven by either of two control knobs (not shown) one of which gives a fast motion drive and the other a slow motion drive. These two knobs are concentrically arranged in well known manner to be independently rotatable about an axis represented by the chain line 22 the slow motion knob being mounted on the shaft 15 and the fast motion knob on the sleeve 18. Both drives are shown as friction drives the slow motion drive being via shaft 15 and friction wheels 14, 13, 16, 17 to the sleeve 18 and thence by wheel 19 to part wheel 20 (which is concentric with and fast on shaft 7), the main or fast motion drive being direct from sleeve 18 to wheel 19 and part wheel 20. The wheels 13, 16, are coupled together for rotation about the axis represented by the chain line 12. As these slow and fast motion drives are of quite ordinary nature they are not shown in full. Any known drive means may be employed to the shaft 7. 21 represents a supporting framework and is preferably part of an enclosing box which assists in obtaining uniform lighting of the scale from the lamps 5. Additional lamps (not shown) for general illumination may be provided as desired.

I claim:

1. An indicator and scale arrangement for a radio receiver, comprising an indicator device provided with a cursor line, a scale provided with a series of radial lines along which indicia are adapted to be marked, and means for moving said cursor line and scale relative to one another, said cursor line having such shape and being so arranged with respect to the lines of said series of lines that said cursor line intersects with only one of the lines of said series at any one time at a point which travels along said line as said relative motion takes place, said point of intersection travelling along the several lines of said series in succession as said relative motion continues.

2. An arrangement as claimed in claim 1 wherein the scale is an annularly shaped scale and the cursor line is a curved line which crosses any radial scale line with which it intersects at an acute angle.

3. An arrangement as claimed in claim 1 wherein the scale is an annularly shaped scale and the cursor line is a curved line which crosses any radial scale line with which it intersects at an acute angle, and the curvature of the cursor line is such as to give equal radial movements of the point of intersection for equal angular relative movements between scale and cursor line.

4. An arrangement as claimed in claim 1 wherein the scale is annularly shaped and is fixed and is arranged to be scanned by a shadow cursor line provided by a curved member carried on a support which is rotatable about the centre point of the said annularly shaped scale.

JOSEPH DOUGLAS BRAILSFORD.